(12) United States Patent
Petit et al.

(10) Patent No.: US 11,890,970 B2
(45) Date of Patent: Feb. 6, 2024

(54) SLIDE RAIL FOR VEHICLE SEAT AND VEHICLE SEAT COMPRISING SUCH A SLIDE RAIL

(71) Applicant: FAURECIA Sièges d'Automobile, Nanterre (FR)

(72) Inventors: Fabrice Petit, Saint Georges des Groseillers (FR); Vincent Nardin, Flers (FR); Olivier Kircher, Saint Georges des Groseillers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 547 days.

(21) Appl. No.: 17/079,991

(22) Filed: Oct. 26, 2020

(65) Prior Publication Data
US 2021/0129710 A1    May 6, 2021

(30) Foreign Application Priority Data
Oct. 31, 2019  (FR) ...................... 1912257

(51) Int. Cl.
*B60N 2/08*      (2006.01)
*B60N 2/02*      (2006.01)

(52) U.S. Cl.
CPC ....... *B60N 2/0818* (2013.01); *B60N 2/02246* (2023.08); *B60N 2/0893* (2013.01); *B60N 2/0856* (2013.01)

(58) Field of Classification Search
CPC .. B60N 2/0818; B60N 2/0232; B60N 2/0893; B60N 2/0856; B60N 2/08; B60N 2/0806; B60N 2/07; B60N 2/0715

USPC .................................................. 248/428, 429
See application file for complete search history.

(56) References Cited

U.S. PATENT DOCUMENTS

| | | | | |
|---|---|---|---|---|
| 5,816,110 A   * | 10/1998 | Schuler | ............... | B60N 2/0715 |
| | | | | 248/429 |
| 11,027,629 B2 * | 6/2021 | Krpo | .................... | B60N 2/0818 |
| 11,192,471 B2 * | 12/2021 | Spagnoli | ............. | B60N 2/0818 |
| 2007/0215778 A1 * | 9/2007 | Kadlec | ................. | B60N 2/0722 |
| | | | | 248/429 |
| 2021/0245632 A1 * | 8/2021 | Spagnoli | ............. | B60N 2/0887 |

FOREIGN PATENT DOCUMENTS

| | | |
|---|---|---|
| EP | 0180422 A2 | 5/1986 |
| JP | 2016215931 A | 12/2016 |
| WO | 9611123 A1 | 4/1996 |

OTHER PUBLICATIONS

French Preliminary Search Report for French App. No. FR1912257 dated Oct. 2, 2020, 8 pages.

\* cited by examiner

*Primary Examiner* — Nkeisha Smith
(74) *Attorney, Agent, or Firm* — Barnes & Thornburg LLP

(57) ABSTRACT

A slide rail for a vehicle seat comprises first and second slide members lockable by a lock which comprises several locking members suitable for entering holes that are part of the first slide member. The lock is mounted on the second slide member so as to provide translational clearance between the lock and the second slide member.

11 Claims, 21 Drawing Sheets

FIG. 21

SLIDE RAIL FOR VEHICLE SEAT AND VEHICLE SEAT COMPRISING SUCH A SLIDE RAIL

PRIORITY CLAIM

This application claims priority to French Patent Application No. FR1912257, filed Oct. 31, 2019, which is expressly incorporated by reference herein.

BACKGROUND

The present disclosure relates to slide rails for vehicle seats and to vehicle seats comprising such slide rails. More particularly, the present disclosure relates to a slide rail for a vehicle seat comprising first and second slide members mounted so as to slide relative to one another along a longitudinal direction.

SUMMARY

According to the present disclosure, a slide rail for a vehicle seat, may have high mechanical strength capable of withstanding an accident undergone by the vehicle.

In illustrative embodiments, a slide rail for a vehicle seat, comprises:
a first slide member and a second slide member which are mounted so as to slide relative to one another along a longitudinal direction, the first slide member comprising holes aligned along the longitudinal direction,
a mechanical lock mounted on the second slide member and comprising several locking members, each locking member being independently movable between an unlocked position where the locking member does not interfere with the holes of the first slide member, and a locked position where the locking member enters a hole of the first slide member to immobilize the first slide member and second slide member relative to one another, the locking members being resiliently biased towards the locking position and being either held in unlocked position when the lock is in an unlocking position, or freely movable to the locked position when the lock is in a locking position, the locking members and the holes of the first slide member being arranged so that several locking members can enter the holes of the first slide member when the lock is in the locking position,
wherein the lock is mounted on the second slide member so as to provide translational clearance between the lock and the second slide member at least in one direction along the longitudinal direction.

Due to these arrangements, when a first locking member engages one of the holes of the first slide member while the second slide member is sliding relative to the first slide member in the direction corresponding to the aforementioned clearance, the lock stops its travel relative to the first slide member without stopping the travel of the second slide member during the fraction of a second corresponding to traveling the aforementioned clearance. During this time, the lock is stopped without undergoing significant force in the longitudinal direction, which allows some or all of the other locking devices to enter the holes of the first slide member without being hindered by jamming phenomena arising from such force. When the aforementioned clearance has been traveled, the locking members are in the locked position, and the lock stops the second slide member while providing optimum mechanical strength.

In illustrative embodiments, one or more of the following arrangements may optionally be used:
the lock is mounted on the second slide member so as to provide the translational clearance between the lock and the second slide member in two opposite directions along the longitudinal direction;
the clearance is maintained resiliently;
the clearance is maintained by a resilient actuator comprising two actuator elements resiliently biased away from each other along the longitudinal direction, each actuator element bearing against an integral portion of the second slide member and against an integral portion of the lock in the longitudinal direction as long as the slide rail is in a normal situation of use;
the second slide member comprises a web and the lock is connected to the web of the second slide member by means of a lock support having a web parallel to the web of the second slide member, the resilient actuator being housed in a first opening formed in the web of the second slide member and in a second opening formed in the web of the lock support, each of the actuator elements bearing against an edge of the first opening and an edge of the second opening in the longitudinal direction as long as the slide rail is in a normal situation of use;
the slide rail further comprises:
a motorized drive mechanism suitable for selectively either immobilizing or driving the second slide member relative to the first slide member, the second slide member being mounted to move relative to the motorized drive mechanism so as to be normally retained in a neutral position with respect to the motorized drive mechanism and the second slide member being movable from the neutral position when the second slide member is subjected to a force greater than a predetermined threshold in the longitudinal direction,
and a lock control member mounted on the second slide member,
the lock control member being connected to the motorized drive mechanism such that the lock control member is:
in a rest position where the lock control member allows the lock to be in the unlocking position when the second slide member is in a neutral position with respect to the motorized drive mechanism,
and in an actuating position where the lock control member controls the lock to move the lock to the locking position when the second slide member is moved from the neutral position with respect to the motorized drive mechanism;
the motorized drive mechanism comprises a driving device suitable for driving a pinion meshed with a rack that is part of the first slide member, the second slide member being mounted so as to slide in the longitudinal direction with respect to the driving device;
the driving device engages with the lock control member by cam action to move the lock control member into the actuating position when the second slide member is moved from the neutral position with respect to the motorized drive mechanism;
the clearance is a few millimeters, for example between 1 and 10 mm, in particular between 5 and 10 mm.

Furthermore, a vehicle seat comprising two slide rails as defined above and a seating portion carried by the second slide member of each slide rail. Each slide rail may have its own motorized drive mechanism, which avoids cluttering up the space under the seating portion with a motor and mechanical transmission means.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 21 is a view similar to FIG. 5, in the locking position;

DETAILED DESCRIPTION

In the various figures, the same references designate identical or similar elements.

Figure 1:
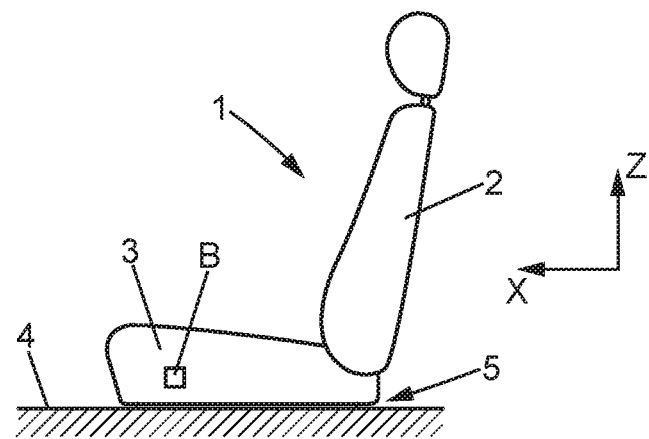
FIG. 1 is a schematic side view of a seat which may include slide rails according to the present description.
Figure 2:
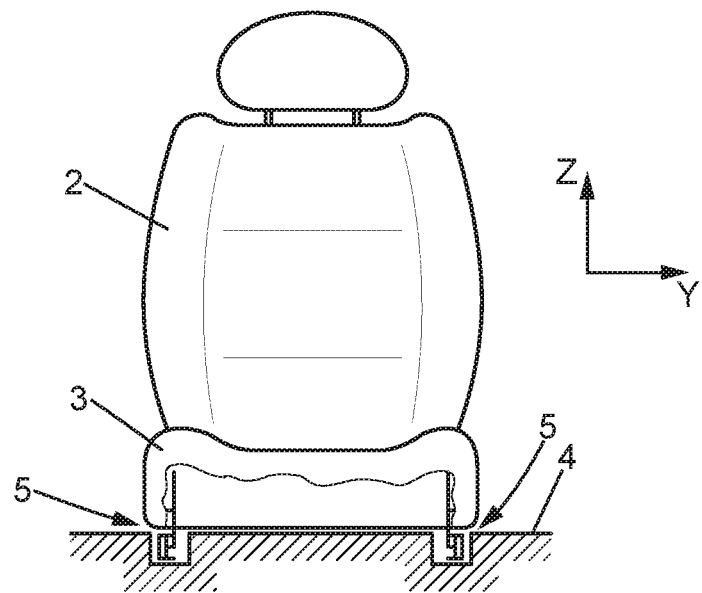
FIG. 2 is a schematic front view of a seat which may include slide rails according to the present description.

FIGS. 1 and 2 show a motor vehicle seat 1 which comprises a backrest 2 carried by a seating portion 3 which itself is mounted on the floor 4 of the vehicle so as to slide in a longitudinal direction X that is substantially horizontal.

The seating portion 3 is connected to the floor 4 by two parallel slide rails 5 extending in the longitudinal direction X.

Each of the slide rails 5 comprises an electric motorized drive mechanism, which will be described below, the motorized drive mechanisms of the two slide rails 5 being synchronously controlled by an electronic control unit (for example a microcontroller or the like) according to commands received in particular from a two-way control button B or similar device operable by a user.

Figure 3:
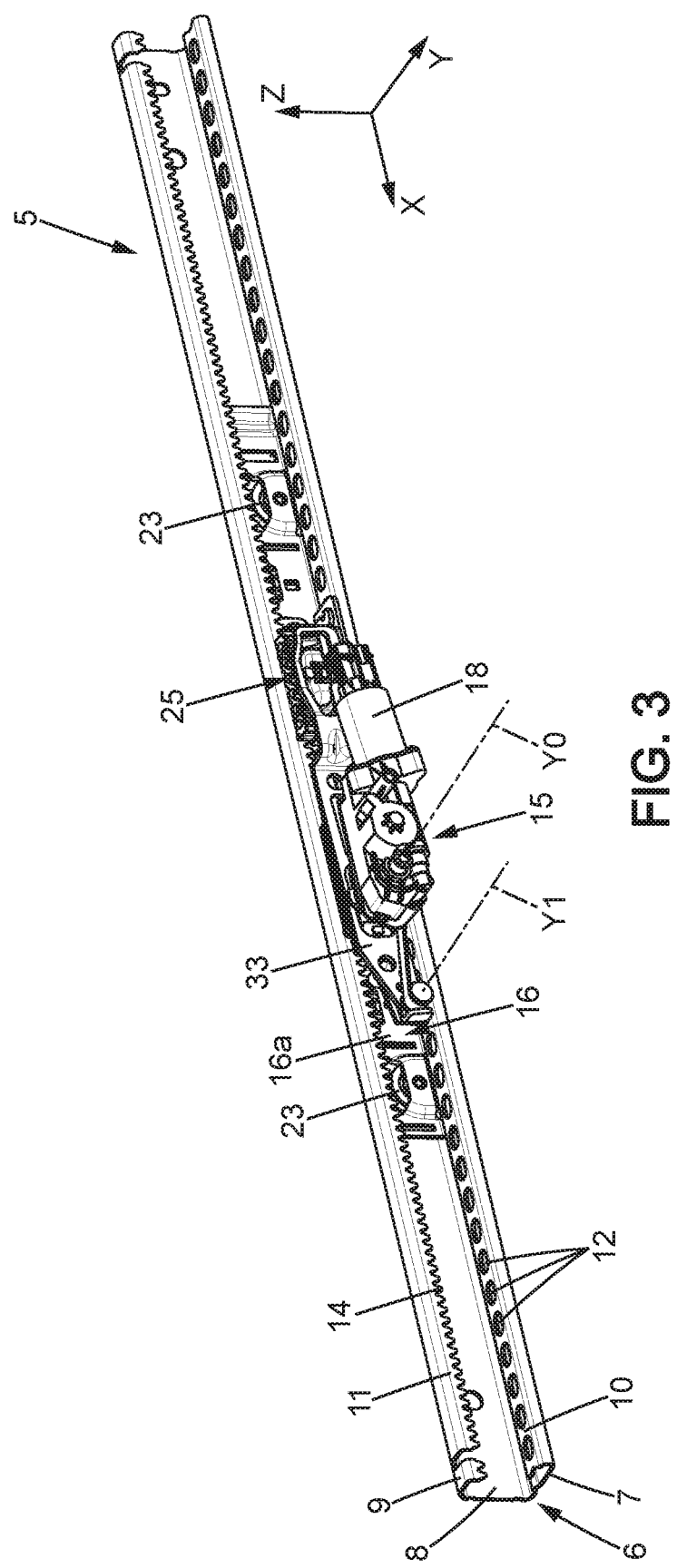
FIG. 3 is a perspective view of one of the slide rails of the seat of FIGS. 1 and 2, in the normal position of use.

As shown in FIG. 3, each slide rail 5 comprises a first slide member 6 and a second slide member 16 which is mounted on the first slide member 6 so as to slide along the longitudinal direction X. One of these first and second slide members is connected to the floor 4 of the vehicle, the other to the seating portion 3. In the example shown, the first slide member 6 is integral with the floor 4 and the second slide member 16 is integral with the seating portion, but the reverse would be possible.

The first slide member 6 may generally be a section, for example of metal, and the second slide member 16 may also comprise a movable section 16a, in particular of metal, or another rigid element, slidably mounted on the first slide member 6.

The first slide member 6 of each slide rail 5 may for example have a C-shaped cross-section which opens horizontally towards the other slide rail 5 of the seat.

The first slide member 6 may comprise, for example:
- a lower flange 7 extending substantially horizontally parallel to the longitudinal direction X and to a transverse horizontal direction Y perpendicular to the longitudinal direction X,
- a web 8 extending upward (parallel to the longitudinal direction X and substantially along a vertical direction Z) from the outer edge of the lower flange,
- and an upper flange 9 extending substantially horizontally to the lower flange 7, from the upper edge of the web 8.

The free edge of the lower flange 7 may comprise a return 10, folded for example substantially 180 degrees towards the web 8 and forming an internal groove.

The free edge of the upper flange 9 may have a return 11 extending downward.

The return 10 of the lower flange 7 may have indentations, for example holes 12, aligned along the longitudinal direction X at a regular pitch.

The return 11 of the upper flange 9 may have a free lower edge that is cut to form a rack 14.

Figure 8:
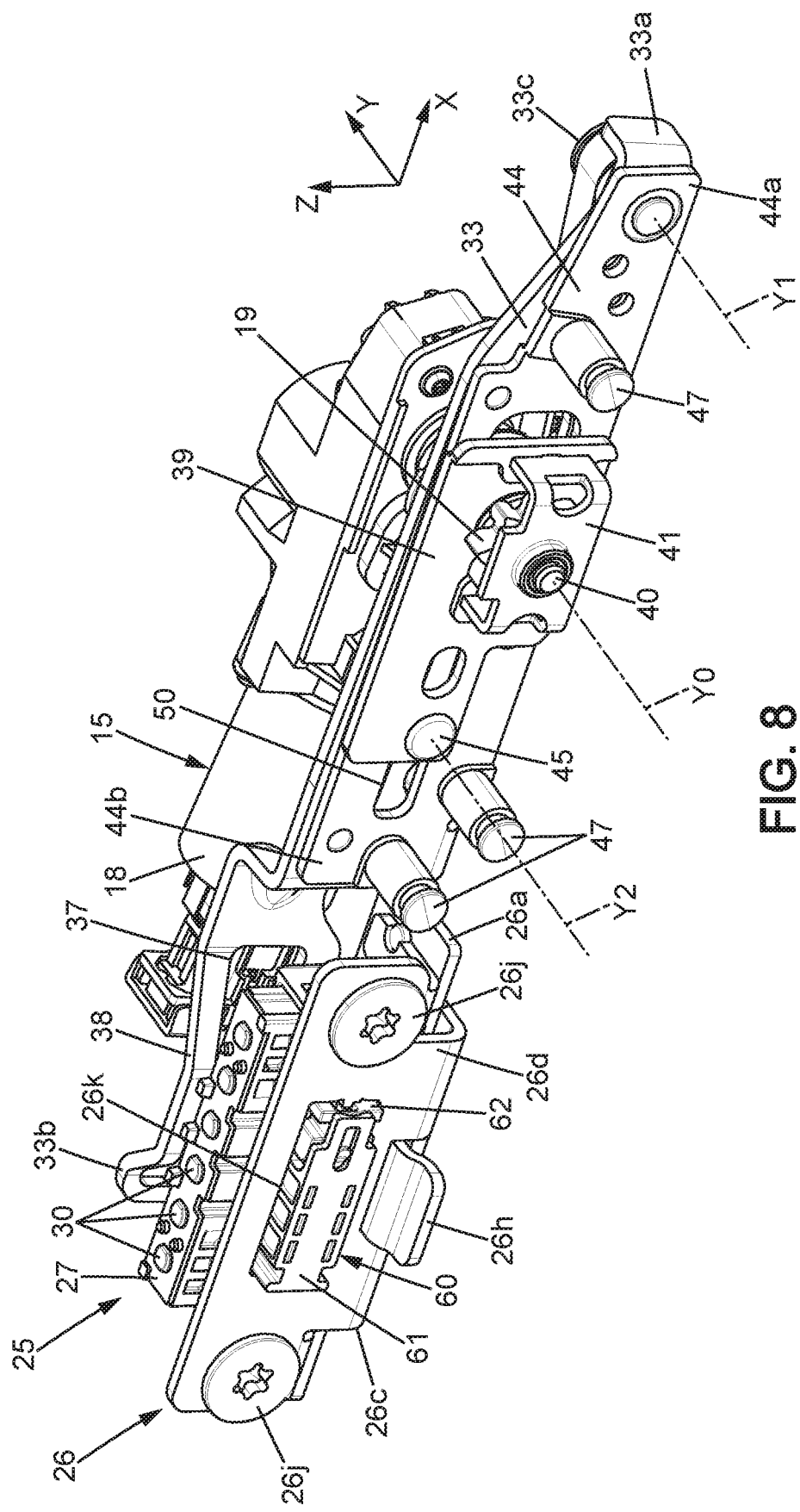
FIG. 8 is a partial perspective view similar to FIG. 6, without the movable section.
Figure 9:
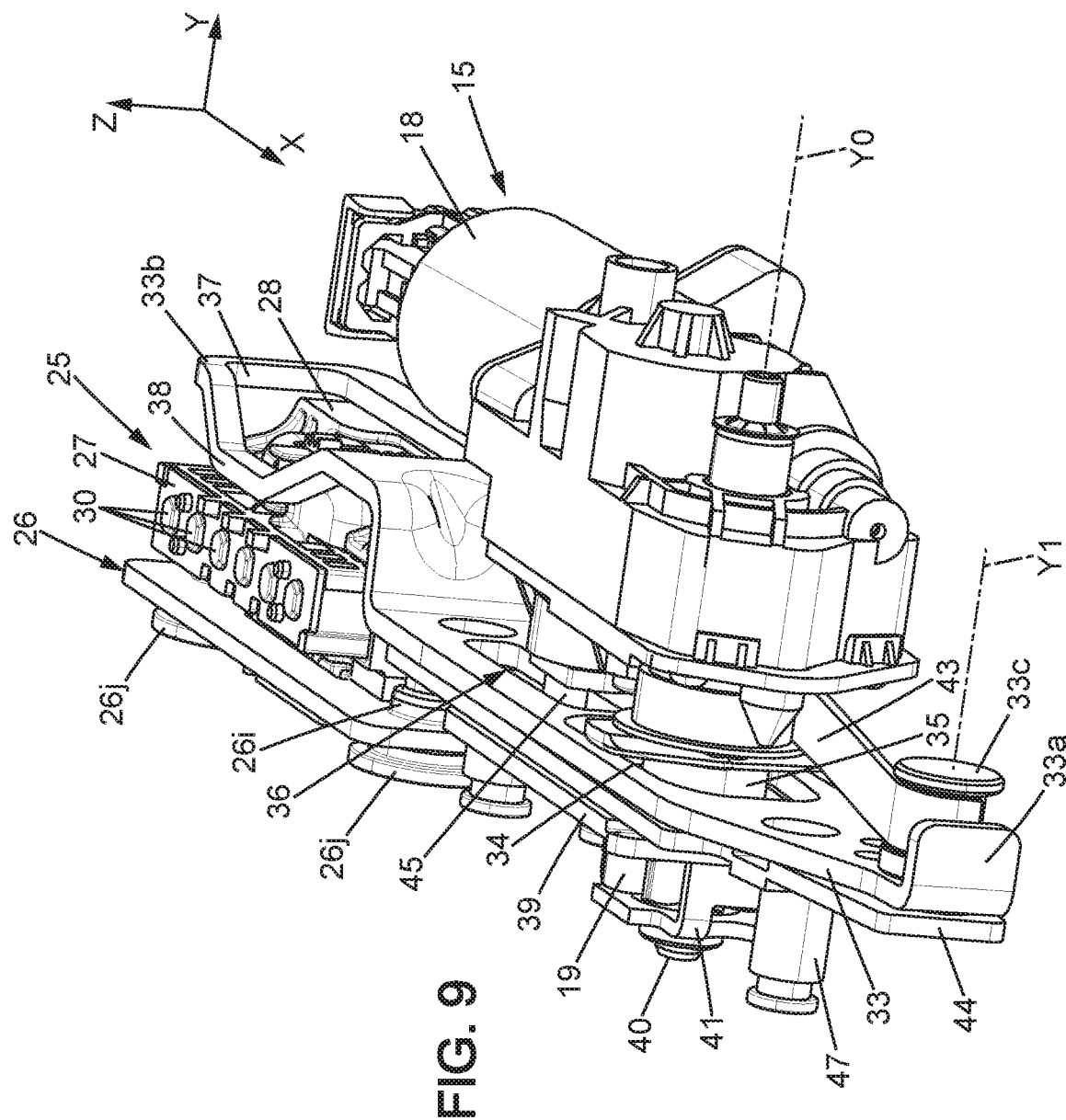
FIG. 9 is a partial perspective view similar to FIG. 8, viewed from another angle.
Figure 10:
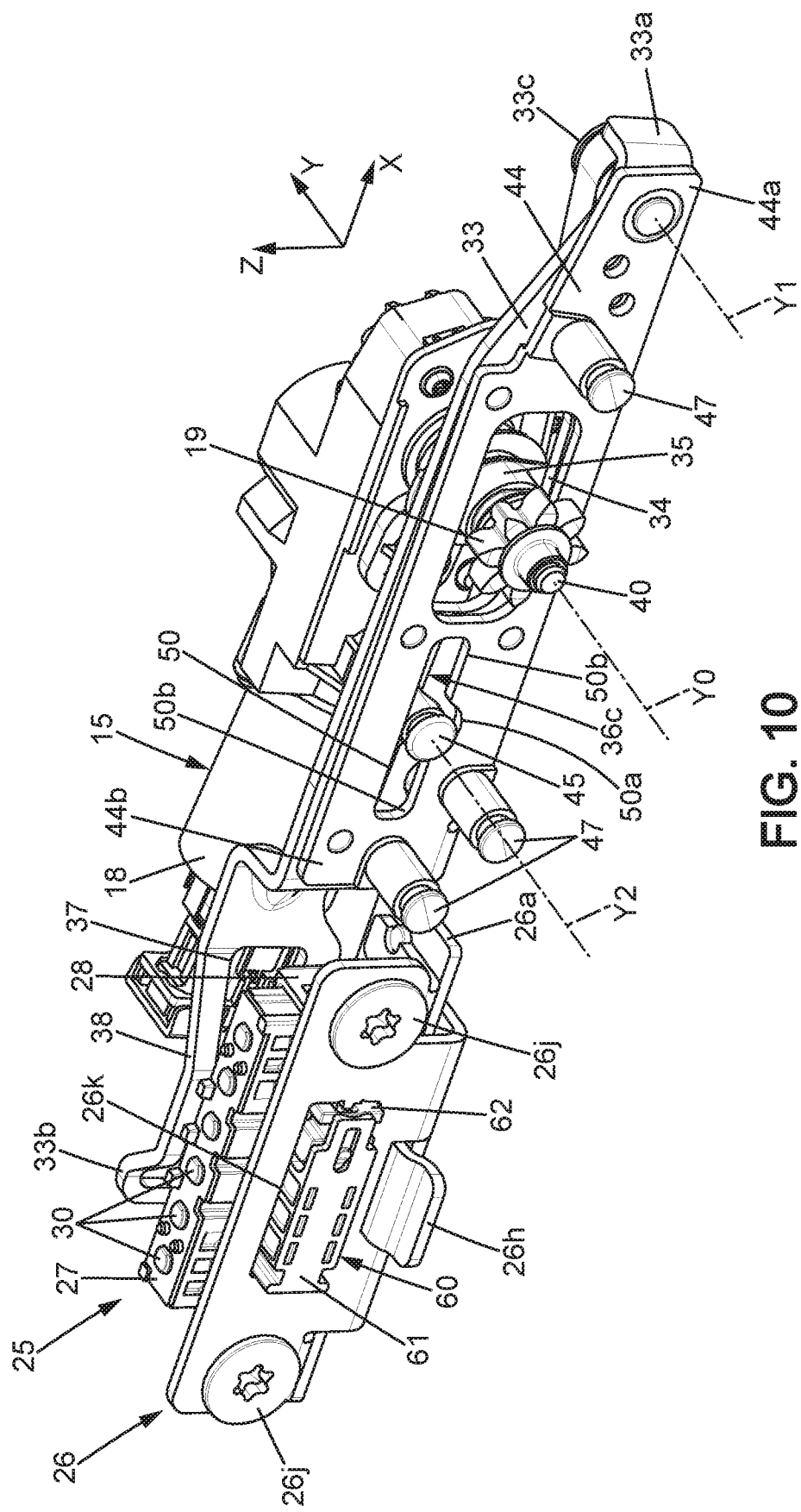
FIG. 10 is a partial perspective view similar to FIG. 8, without the connecting member which supports the pinion of the motorized driving device.
Figure 11:
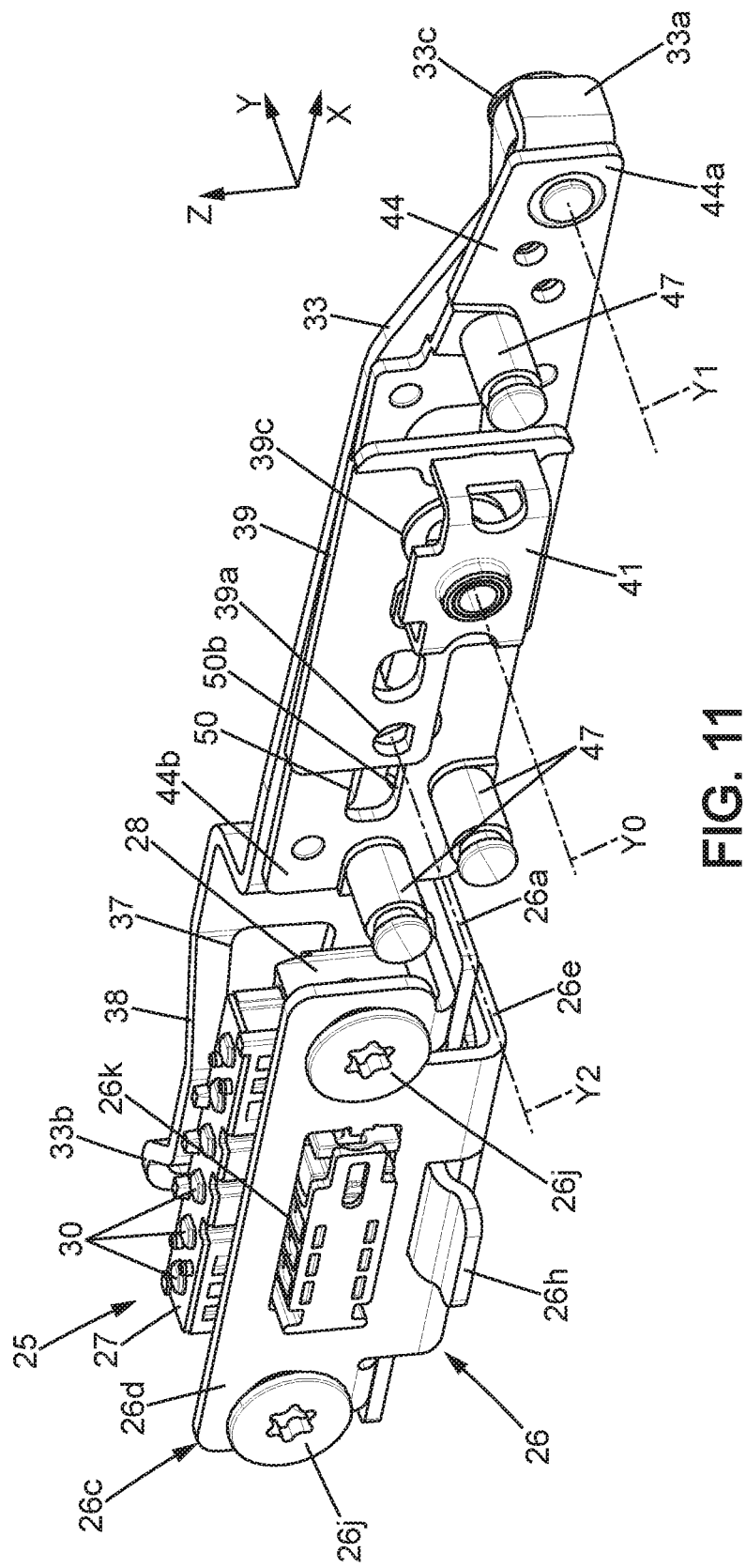
FIG. 11 is a view similar to FIG. 8, without the motorized driving device.
Figure 12:
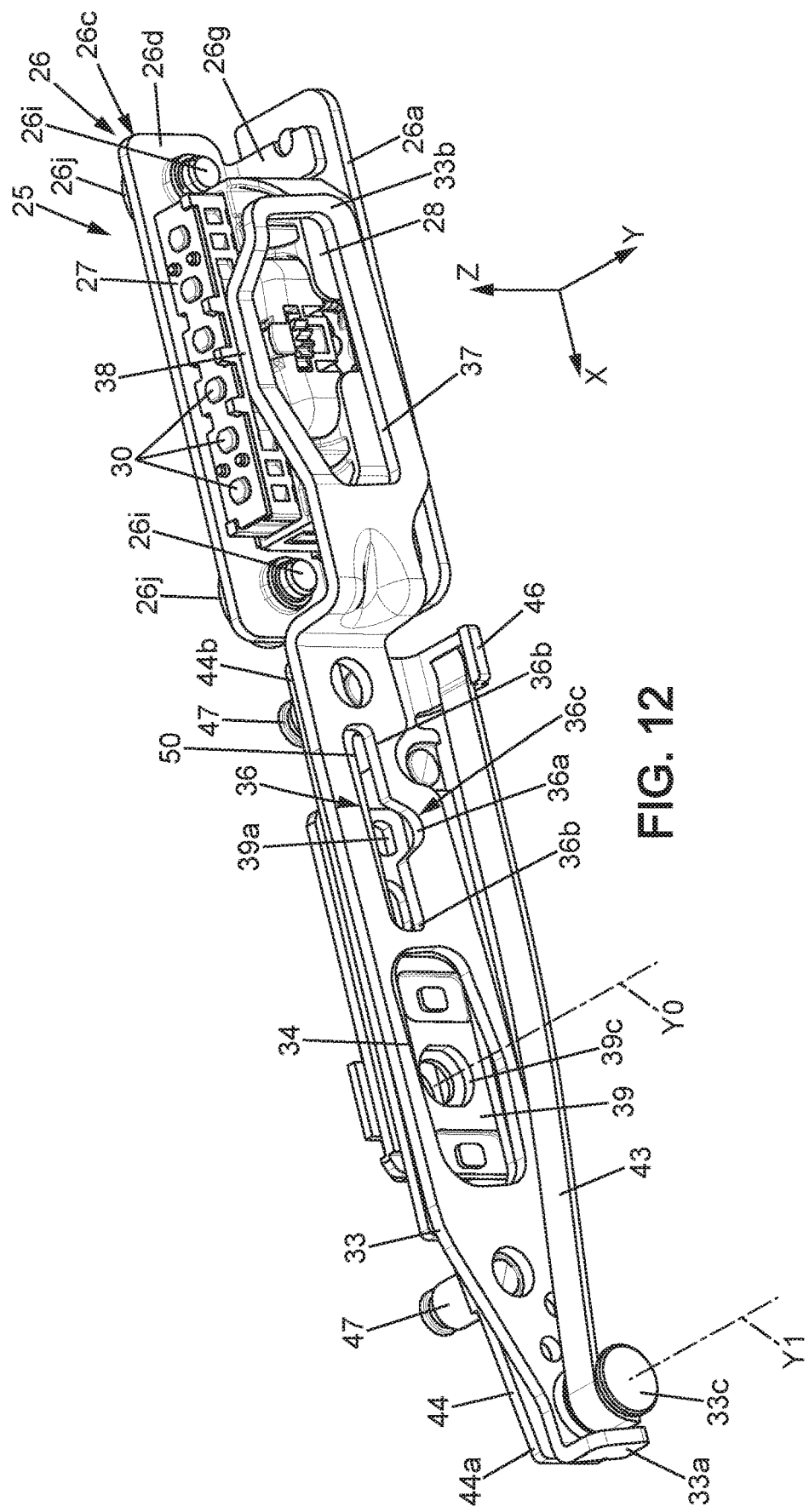
FIG. 12 is a view similar to FIG. 11, viewed in the opposite direction.
Figure 13:
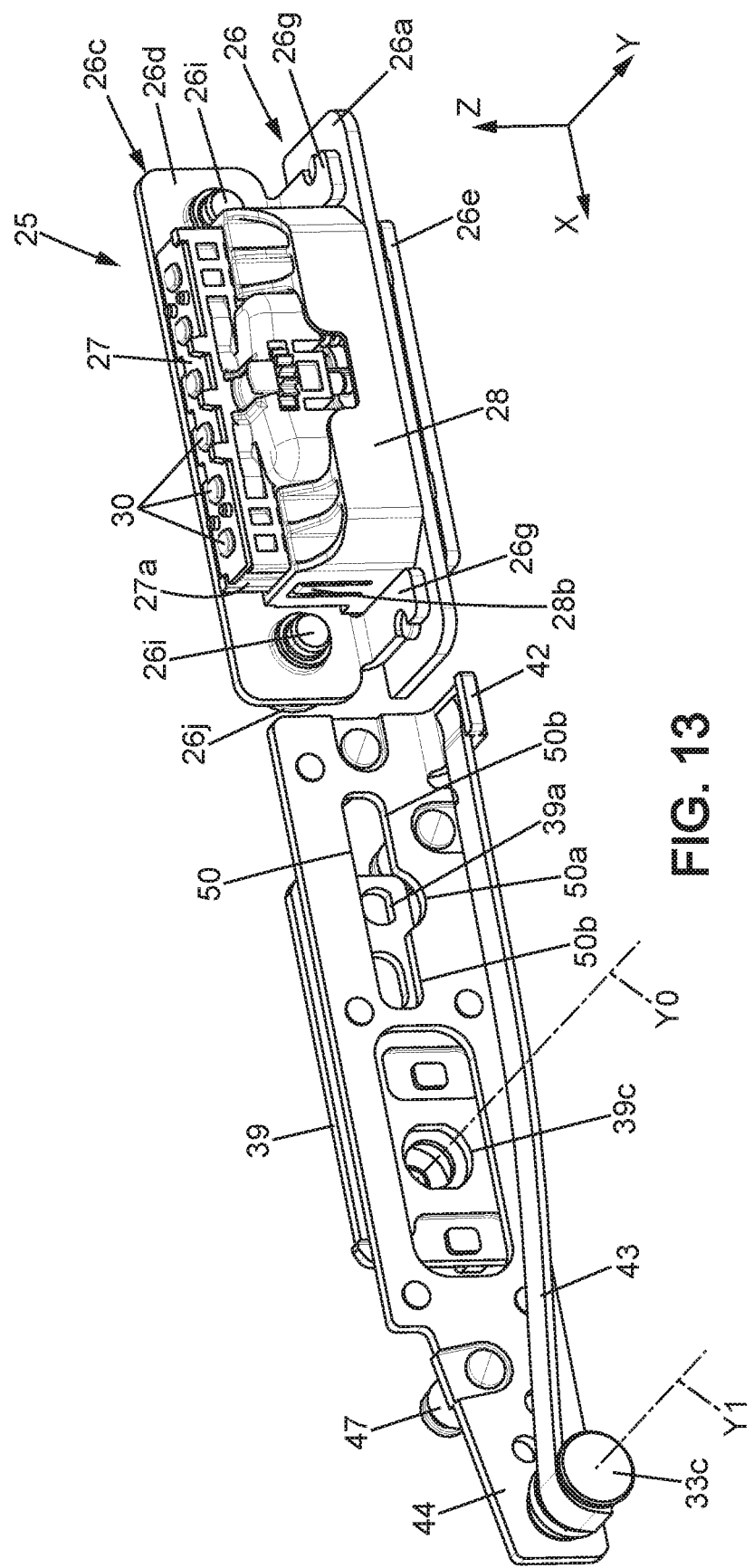
FIG. 13 is a view similar to FIG. 12, without the lock control member.
Figure 14:
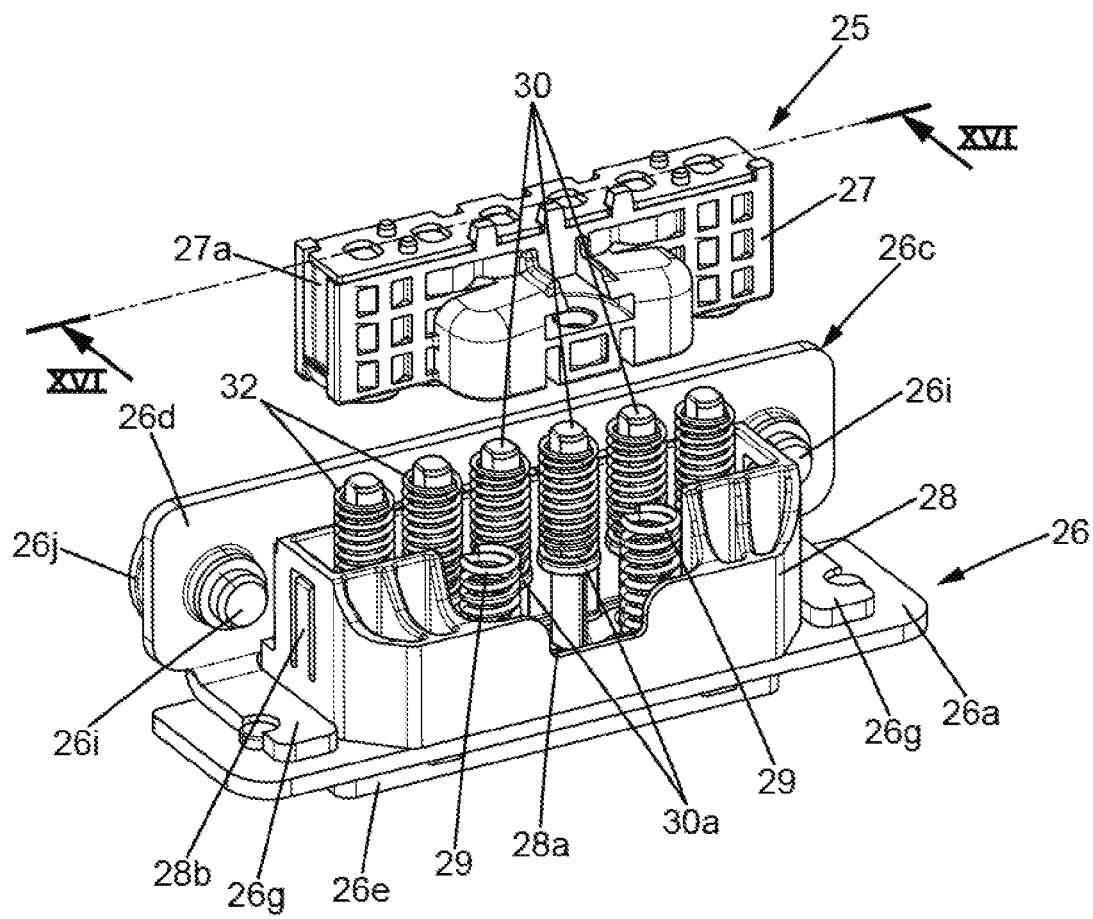
FIG. 14 is an exploded perspective view of the lock of the slide rail of FIGS. 3 to 13 with the lock support, in a three-quarter view from above.
Figure 15:
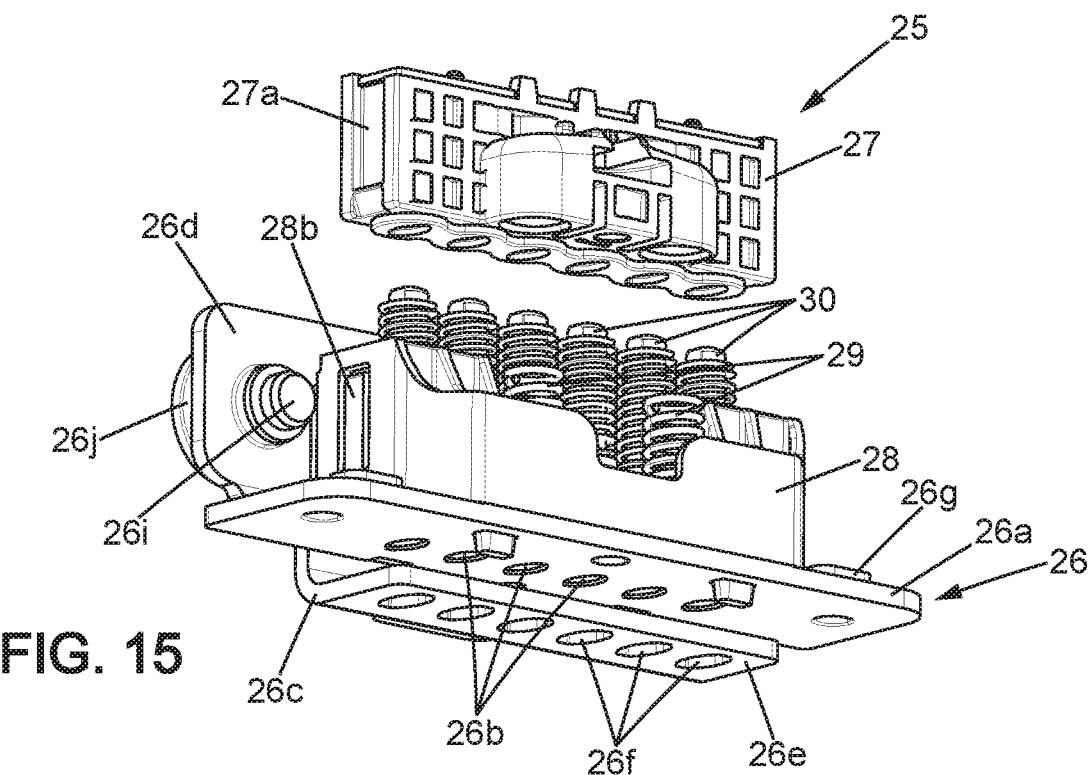
FIG. 15 is a view similar to FIG. 14, in a three-quarter view from below.
Figure 16:
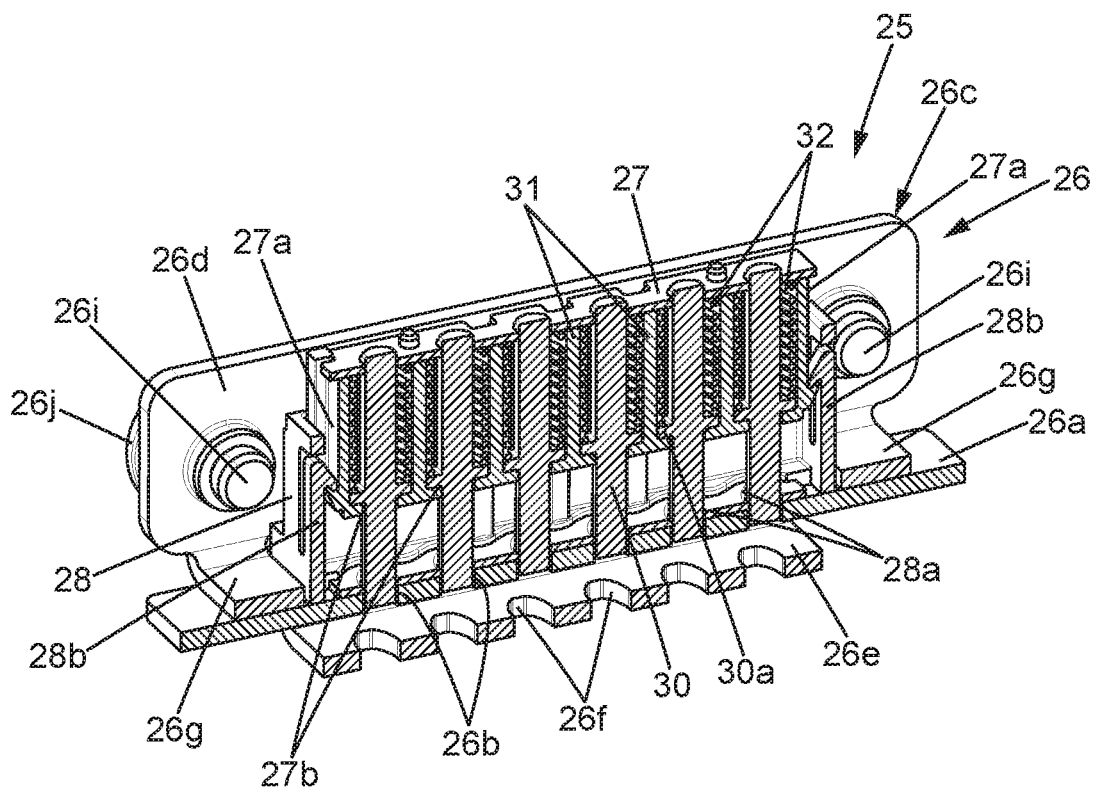
FIG. 16 is a vertical sectional view of the lock and lock support of FIGS. 14 and 15.

The motorized drive mechanism 15 may for example comprise a driving device 18 mounted on the second slide member 16. The driving device 18 may for example be a gear motor or the like, for example driving a pinion 19 to rotate about an axis of rotation Y0 parallel to the transverse direction Y (see FIG. 8 in particular). The pinion 19 meshes with the rack 14.

Figure 4:
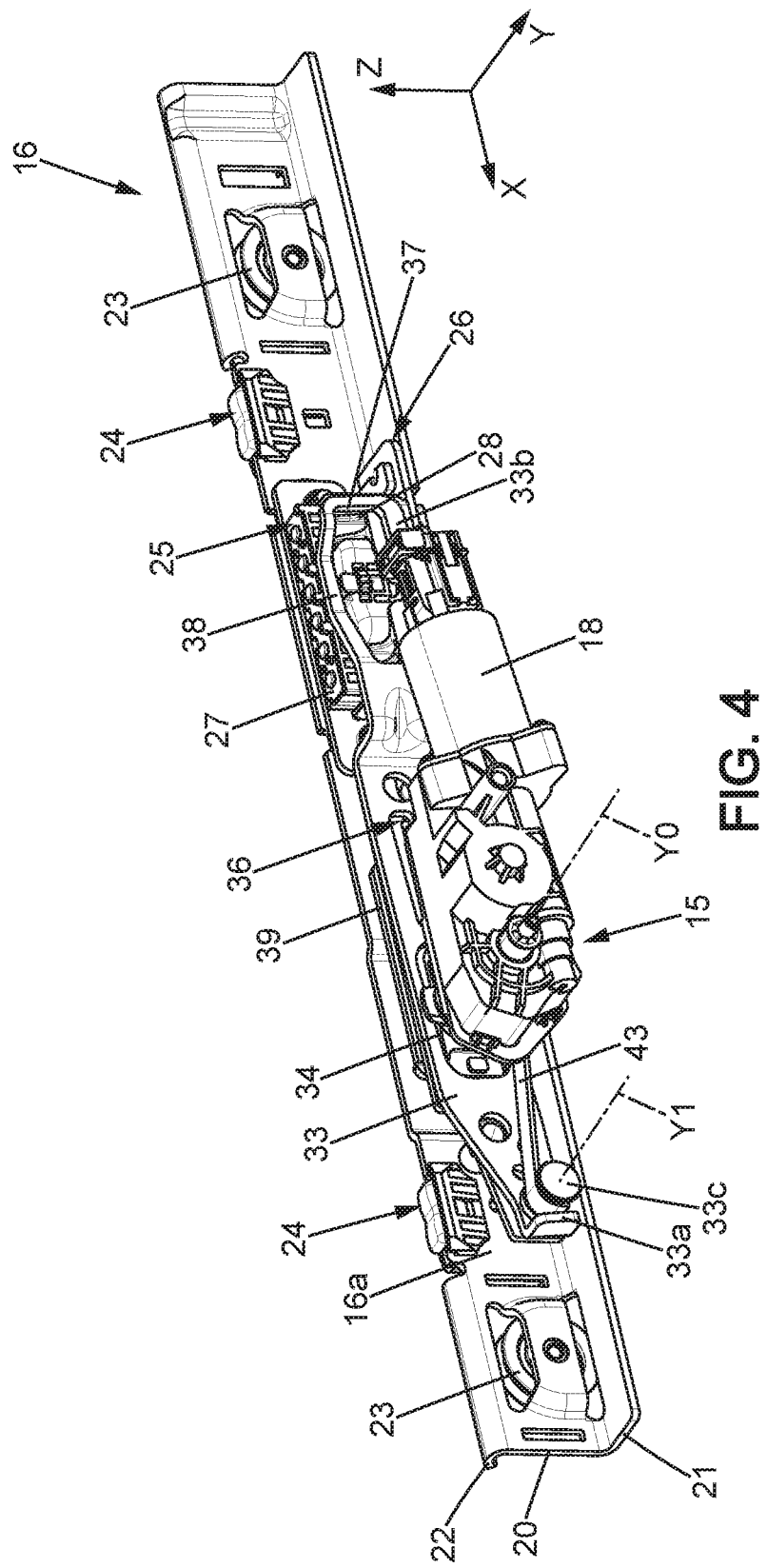
FIG. 4 is a perspective view of the second slide member of the slide rail of FIG. 3, in a three-quarter view from above.
Figure 5:
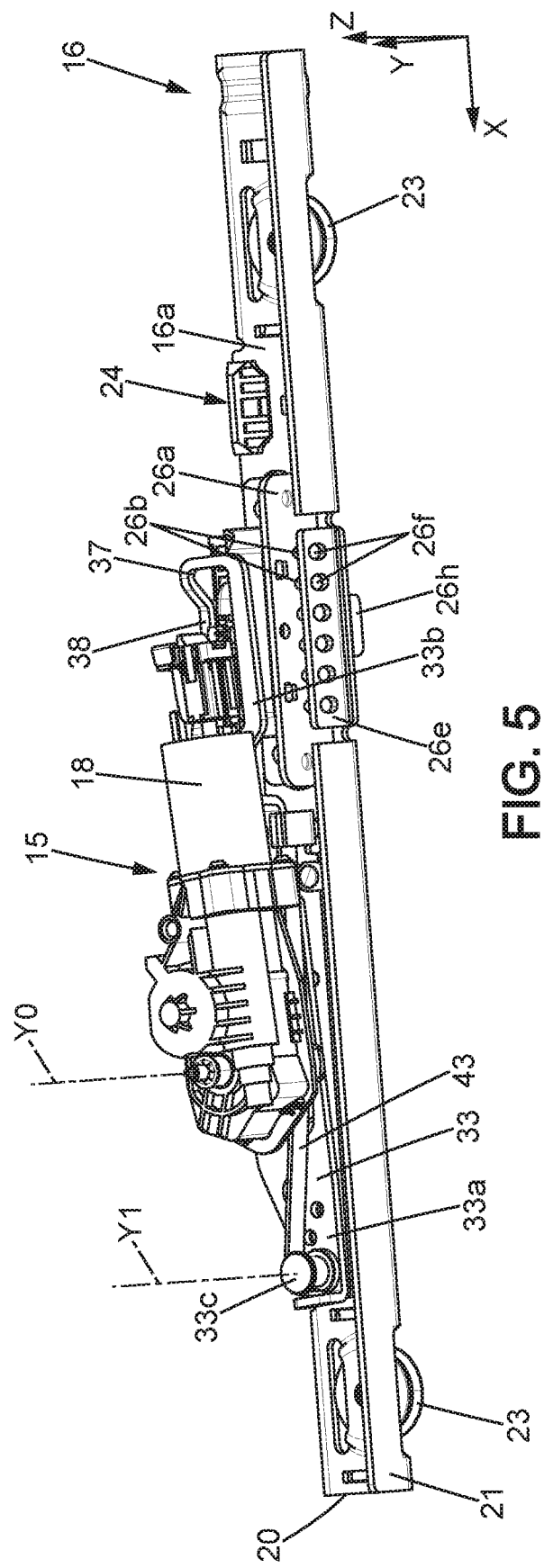
FIG. 5 is a perspective view of the second slide member in the normal position of use, in a three-quarter view from below.
Figure 6:
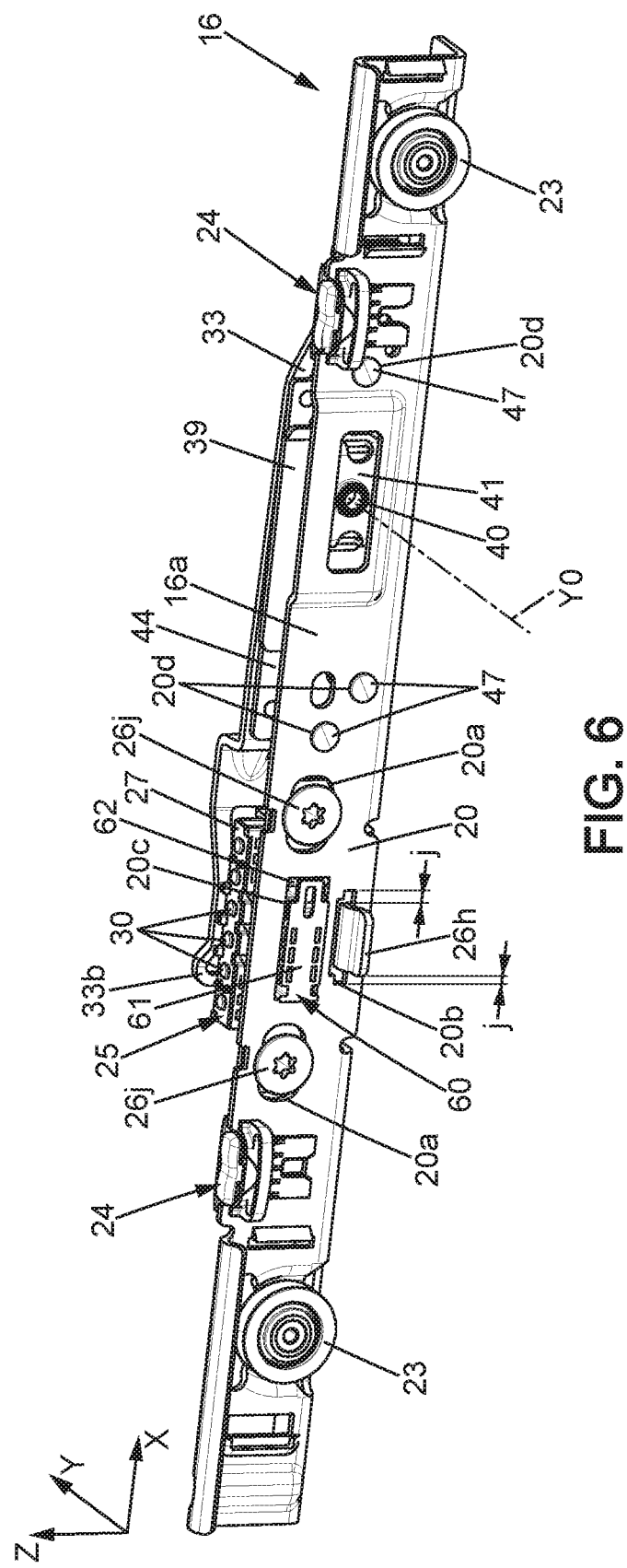
FIG. 6 is a view similar to FIG. 4, in the opposite direction.
Figure 7:
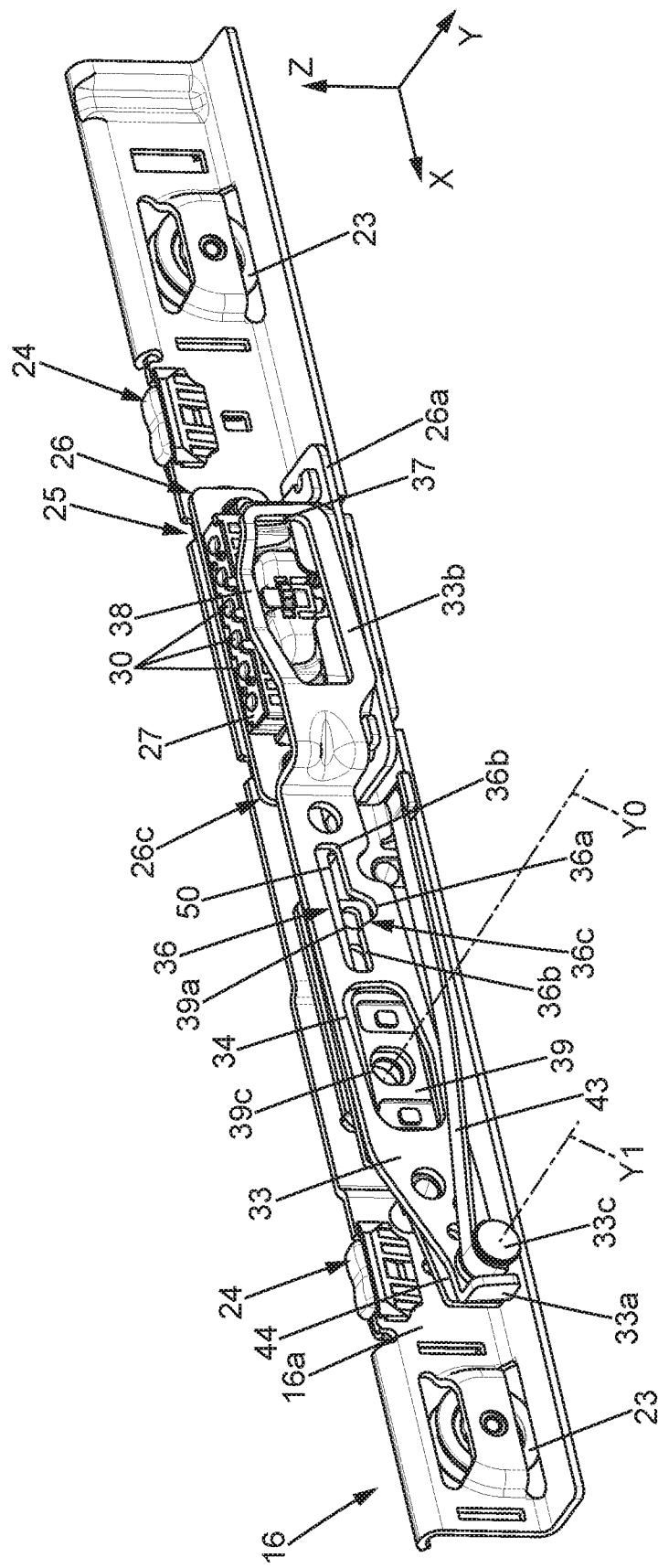
FIG. 7 is a partial view similar to FIG. 4, without the motorized driving device.

As shown in FIGS. 4 to 6, the movable section 16a may comprise:
- a vertical web 20 adjacent to the web 8 of the fixed section,
- a lower flange 21 arranged above the lower flange 7 of the first slide member 6, in the groove defined between the lower flange 7 and the folded return 10 of the first slide member 6,
- and an upper flange 22 arranged below the upper flange 9 of the first slide member 6.

The movable section 16a may comprise rollers 23 rolling on the inner surface of the lower flange 7 of the first slide member 6, to allow the longitudinal sliding of the movable section 16. The movable section 16*a* may further comprise glide shoes 24 coming to rest under the upper flange 9 of the first slide member 6, between the web 8 and the folded return 11 of the first slide member 6.

The slide rail 5 further comprises at least one mechanical lock 25 movable between an unlocking position where the lock 25 allows the second slide member 16 to slide freely in the longitudinal direction X, and a locking position where the lock 25 immobilizes the second slide member 16 on the first slide member 6, the lock 25 normally being held in the unlocking position.

The lock 25 may be mounted on the second slide member 16 so as to move perpendicularly to the longitudinal direction X, for example along the vertical direction Z.

In the example shown in the drawings, the second slide member 16 comprises a lock support 26, for example of metal, which is clearly visible in FIGS. 8 to 16 and which carries the lock 25. The lock support 26 is mounted on the movable section 16*a* with a translational clearance j along the longitudinal direction X, in at least one direction, and advantageously without any other degree of freedom. Here the clearance j is in the two opposite directions (therefore clearance j towards the front and clearance j towards the rear). The clearance j may be a few millimeters, for example 5 to 10 mm.

In the example considered here, the lock support 26 is made of two metal parts which are secured together, for example by welding, namely a guide plate 26*a* and a mounting bracket 26*c*.

The guide plate 26*a* extends horizontally along the XY plane and has guide holes 26*b* aligned along the longitudinal direction X.

The mounting bracket 26*c* comprises:

a web 26*d* extending in the vertical plane XZ and placed in abutment against the vertical web 20 of the movable section 16*a*, a lower horizontal flange 26*e* which extends in the XY plane below the guide plate 26*a* and which comprises receiving holes 26*f* arranged in correspondence with the guide holes 26*b*.

The guide plate 26*a* is located above the return 10 of the first slide member 6, while the flange 26*e* of the mounting bracket is located below the return 10 of the first slide member 6, in the groove defined between the return 10 and the lower flange 7 of the first slide member 6.

The mounting bracket 26*c* may further comprise two horizontal tabs 26*g* to which the guide plate 26*a* is fixed, for example by welding.

As shown in particular in FIGS. 6, 8, 10, 11, the mounting bracket 26*c* may be mounted on the web 20 of the movable section 16*a* for example by two screws (or rivets) 26*i* integral with the web 26*d* of the mounting bracket 26*c*, which are mounted so as to slide in oblong holes 20*a* of the web 20 of the movable section 16*a*. The oblong holes 20*a* extend longitudinally along direction X, enabling the aforementioned clearance j. The screws 26*i* each comprise an enlarged head 26*j* which rests on the face of the web 20 opposite the mounting bracket 26*c*. Furthermore, the guide plate 26*a* may further comprise a substantially horizontal tab 26*h*, which passes through the web 26*d* of the mounting bracket 26*c* with no clearance and which is engaged in a notch 20*b* formed in the aforementioned web 20, also enabling the aforementioned clearance j.

The lock support 26 is held resiliently on the movable section 16*a* in a centered position, leaving the aforementioned clearance j of the lock support with respect to the movable section 16*a*, in each direction along the longitudinal direction X.

For this purpose, as shown in FIGS. 6, 8, 10, 11, 17, 18, the web 20 of the movable section 16*a* and the web 26*d* of the mounting bracket 26*c* may respectively comprise openings 20*c*, 26*k* arranged to have the same dimensions and to be in mutual correspondence. These openings 20*c*, 26*k* may for example be rectangular in shape. A resilient actuator 60 is arranged in the openings 20*c*, 26*k*, this actuator comprising two actuator elements 61, 62 mounted to slide relative to one another in the longitudinal direction X and resiliently biased away from one another while bearing in the X direction against the opposite edges of the openings 26*k*, 20*c*. This resilient biasing may be produced by a spring 63, for example a coil spring, arranged between the two actuator elements 61, 62.

The two actuator elements 61, 62 may be molded plastic parts. The two actuator elements 61, 62 may be mounted one on the other by snap-fitting to interlock. The two actuator elements 61, 62 together may define a housing containing the spring 63.

The lock 25 may comprise a lock body 27 which is mounted so as to slide, for example in the vertical direction Z, on a guide 28 integral with the lock support 26. The guiding of the lock body on the guide 28 may occur for example by an engagement of the lock body 27 in the guide 28. The lock body 27 is resiliently biased towards the unlocking position (in this case upwards), for example by two coil springs 29 arranged in the guide 28.

The lock body 27 and the guide 28 may be created for example by plastic molding. The lock body 27 may be retained on the guide 28 for example by two tabs 28*b* of the guide 28 which clip into vertical grooves 27*a* of the lock body 27 and slide in these grooves 27*a*. The guide 28 may be fixed for example on the guide plate 26*a* by clipping or other attachment.

The lock 25 may further comprise a plurality of locking pistons 30, generally of metal, which slide independently of one another in the lock body 27 along the vertical direction Z (or more generally in the direction of actuation of the lock body 27). The locking pistons 30 may for example be six in number, but could be of a different number. The locking pistons 30 are in mutual alignment along the longitudinal direction X.

The locking pistons 30 may each comprise an enlarged head 30*a* mounted to slide in a cylinder 31 having a central axis parallel to the vertical direction Z, formed in the lock body 27. Each locking piston 30 extends towards the flange 10 of the first slide member 6, in this case vertically downwards, while passing through an opening 27*b* at the base of the lock body 27. The opening 27*b* is too narrow for the enlarged head 30*a* of the locking piston 30, such that the locking piston 28 cannot be separated from the lock body 27.

The guide 28 may also comprise openings 28*a* in correspondence with openings 27*b* and also traversed by the pistons 30.

In the unlocking position, the lower ends of the locking pistons 30 are also engaged in the guide holes 26*b* of the guide plate, but are not engaged in the holes 12 of the first slide member 6 or in the receiving holes 26*f* of the flange 26*e* of the mounting bracket 26*c*.

Each locking piston 30 is resiliently biased downward, independently of the others, by a spring 32 arranged in the corresponding cylinder 31. The locking pistons 30 may or may not be cylinders of revolution, and the holes 27b, 28a, 26b, 26f may have substantially the same cross-section as the locking pistons 30.

The locking pistons 30 are arranged above the holes 12 of the folded return 10 of the first slide member 6, such that, regardless of the position of the second slide member 16 along the X axis, at least one locking piston 30 (or even two) is able to enter a hole 12 of the folded return 10 and the receiving hole 26f corresponding to the locking piston 30, as soon as the lock body 27 descends into the locking position. The holes 12 may be oblong and aligned along the longitudinal direction 10 to facilitate this instantaneous locking.

As shown in particular in FIGS. 4 to 12, the slide rail 5 further comprises a lock control member 33 mounted on the second slide member 16. The lock control member 33 is movable between a rest position where the lock control member 33 allows the lock 25 to be in an unlocking position and an actuating position where the lock control member 33 controls the lock 25 to move the lock 25 into the locking position.

The lock control member 33 may for example be a piece of sheet metal extending substantially along the longitudinal direction X between a first end 33a and a second end 33b. The lock control member 33 generally extends in the vertical plane XZ. The lock control member 33 may in particular be mounted to pivot relative to the second slide member 16, by means of a pivot 33c, about a pivot axis Y1 parallel to the transverse direction Y. The lock control member 33 may be arranged between the driving device 18 and the web 20 of the movable section 16a.

The lock control member 33 may comprise a window 34 traversed by a sleeve 35 integral with the driving device 18 while allowing relative movements between the lock control member 33 and driving device 18 along the longitudinal direction X and along the vertical direction Z. The sleeve 35 surrounds a shaft 40 which connects the driving device 18 to the aforementioned pinion 19.

The lock control member 33 may further comprise a slot 36 which extends substantially in the longitudinal direction X and has a cam edge 36c (in this case the lower edge of the slot 36) which comprises a downward central notch 36a, separating two rectilinear portions 36b extending opposite one another from the notch 36a.

The lock control member 33 may further comprise, at its second end 33b, an opening 37 which defines an upper edge 38 suitable for pressing down on the lock body 27 when the lock control member 33 pivots downward about the pivot axis Y1.

The slide rail 5 further comprises a connecting plate 39, visible in particular in FIGS. 6 to 13, which extends substantially parallel to the lock control member 33. The connecting plate 39 has a recess 39a in which is housed a rigid pin 45 which is integral with the driving device 18 and which extends along a pivot axis Y2 parallel to the transverse direction Y.

The connecting plate 39 further comprises a recess 39c which is traversed without clearance by the aforementioned sleeve 35 which is part of the driving device 18. Recess 39c is closer to the pivot axis Y1 than recess 39a. The connecting plate 39 may be integral with a pinion support 41 on which the aforementioned shaft 40 rotates.

The connecting plate 39 may be formed in particular from sheet metal. The connecting plate 39 may be arranged against the web 20 of the movable section 16a.

The second slide member 16 may further comprise a drive support 44 which may for example be a piece of sheet metal parallel to the lock control member 33, which extends longitudinally in the X direction between a first end 44a close to the first end 33a of the lock control member 33, and a second end 44b located towards the second end 33b of the lock control member 33. The drive support 44 may be interposed between the connecting plate 39 and the lock control member 33, such that the connecting plate 39 can only move within the vertical plane XZ.

The drive support 44 is secured to the second slide member 16, for example by rivets 47 engaged in corresponding recesses 20d of the web 20 of the movable section 16a. The lock control member 33 may be pivotally mounted at the first end 44a of the drive support 44, for example by means of the aforementioned pivot 33c which is integral with the drive support 44.

The drive support 44 further comprises, towards its second end 44b, a guide slot 50 parallel to the longitudinal direction X, in which the aforementioned pin 45 is engaged.

The guide slot 50 may have a lower edge having a downward central notch 50a, separating two rectilinear portions 50b extending opposite each other from the notch 50a.

The mounting of the pin 45 in the slot 50 allows both a relative sliding between the second slide member 16 and the driving device 18 along the longitudinal direction X, and a pivoting of the driving device 18 with the connecting plate 39, about the pivot axis Y2.

The driving device 18 is in addition resiliently biased upwards, in pivoting about the pivot axis Y2, so that the pinion 19 remains meshed with the rack 14. This resilient bias may be exerted by a spring 43.

The spring 43 may for example be a leaf spring having one end integral with a tab 46 formed at the second end 44b of the drive support 44 and one end bearing on the pivot 33c, an intermediate portion of the leaf spring resiliently bearing under the aforementioned sleeve 35.

The pin 45 of the driving device 18 is engaged in the slot 36 of the lock control member and is normally held in the notch 36a of this slot 36 by the upward pivoting bias exerted by the springs 29 of the lock 25 on the lock body 27 and therefore on the lock control member 33.

Figure 17:
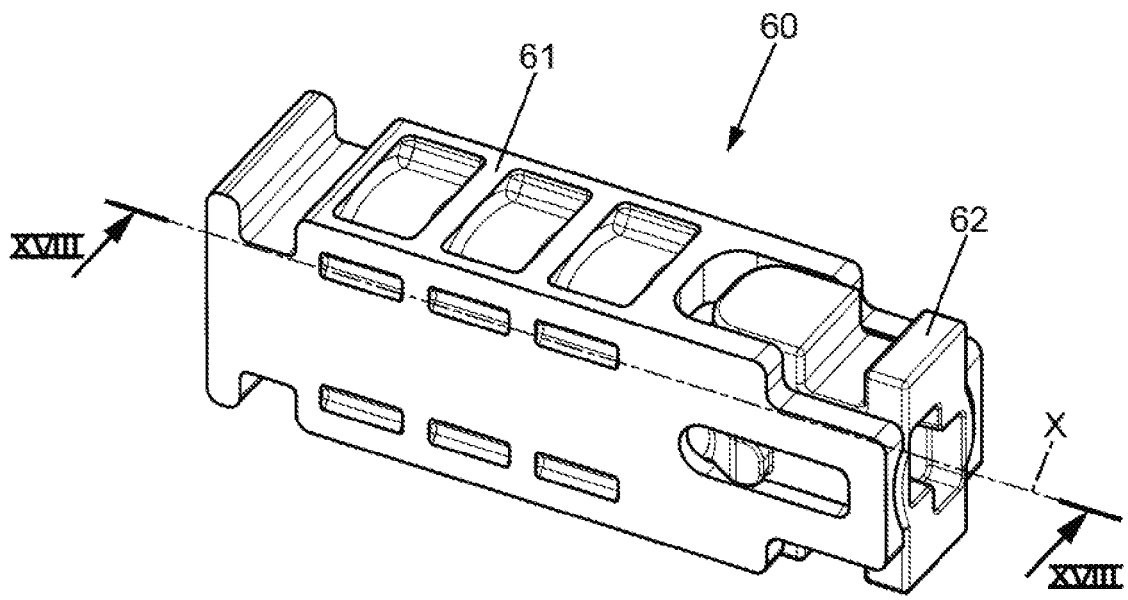
FIG. 17 is a perspective view of a resilient actuator that is part of the slide rail.
Figure 18:
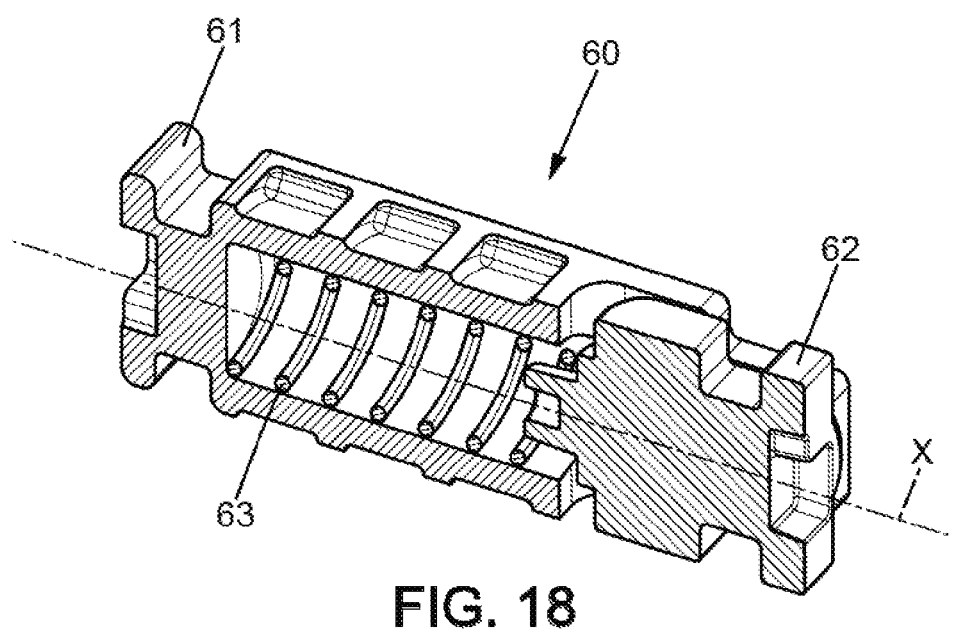
FIG. 18 is a vertical sectional view of the resilient actuator of FIG. 17.
Figure 19:
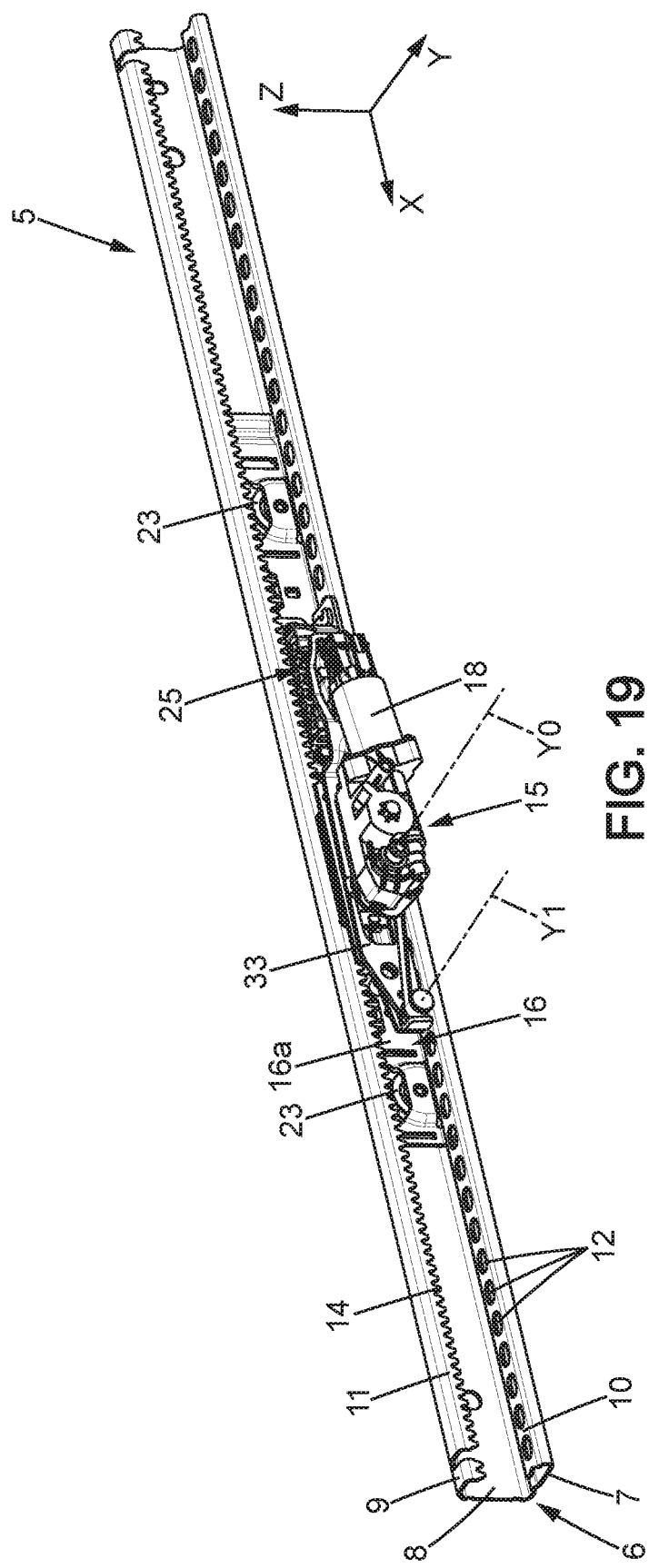
FIG. 19 is a view similar to FIG. 3 but enlarged, in the locking position.
Figure 20:
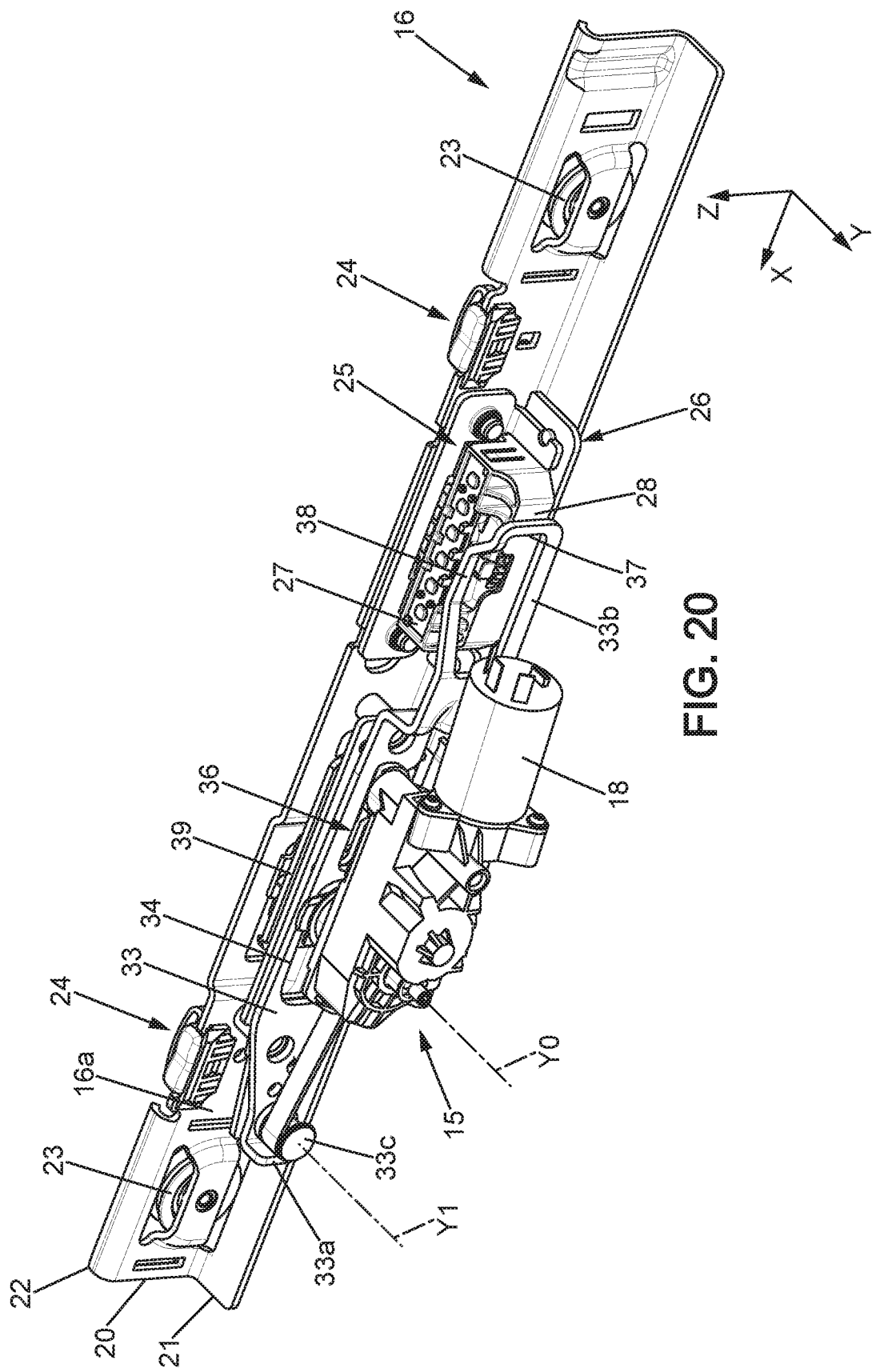
FIG. 20 is a view similar to FIG. 4, in the locking position.
Figure 21:
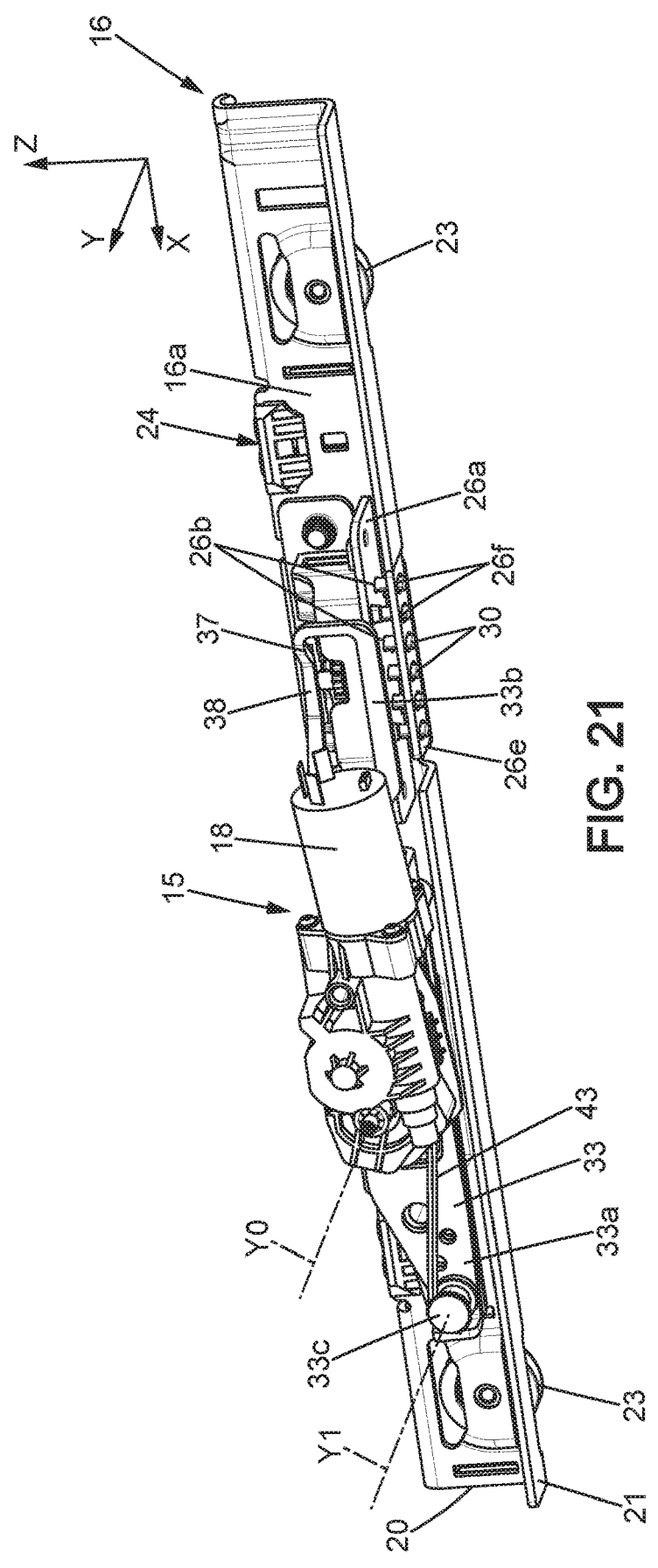
Figure 22:
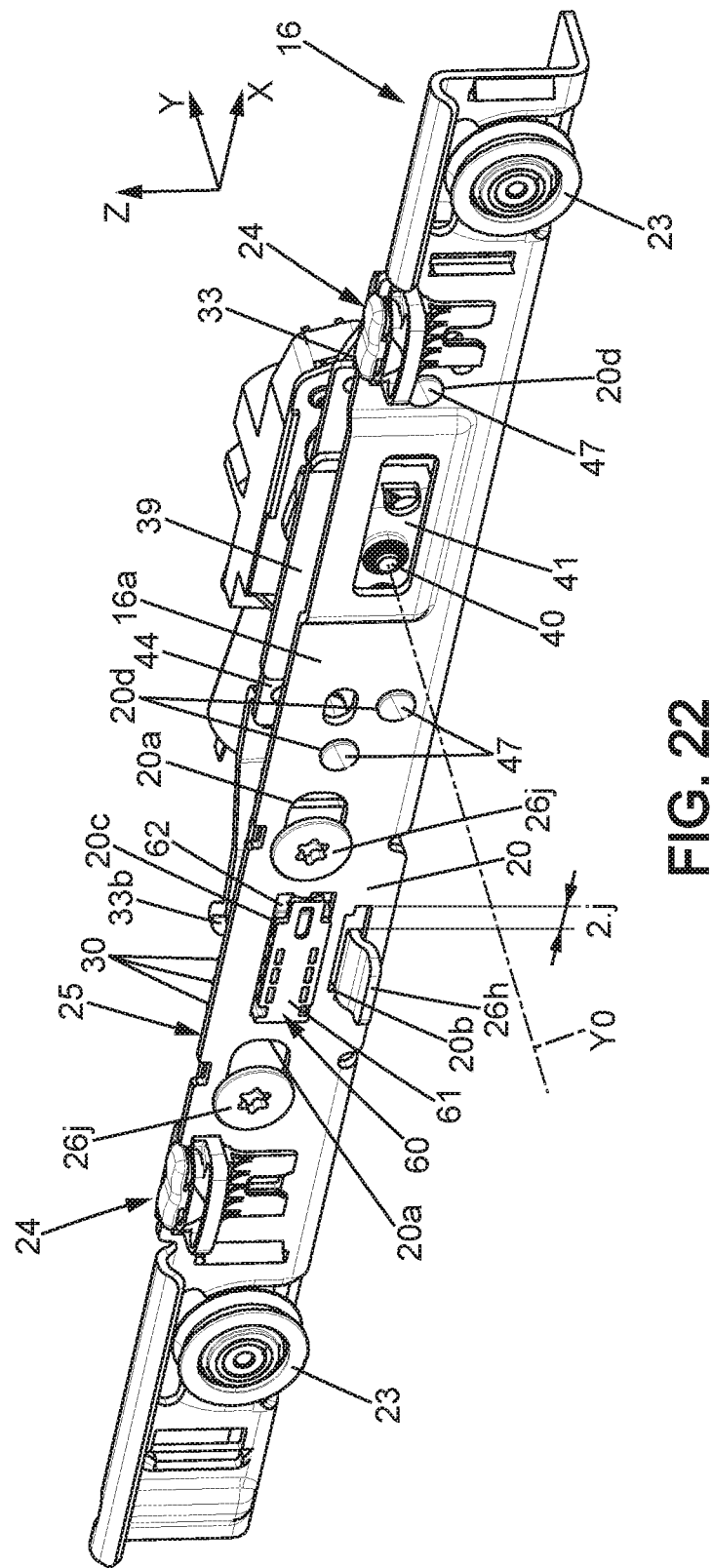
FIG. 22 is a view similar to FIG. 6, in the locking position.
Figure 23:
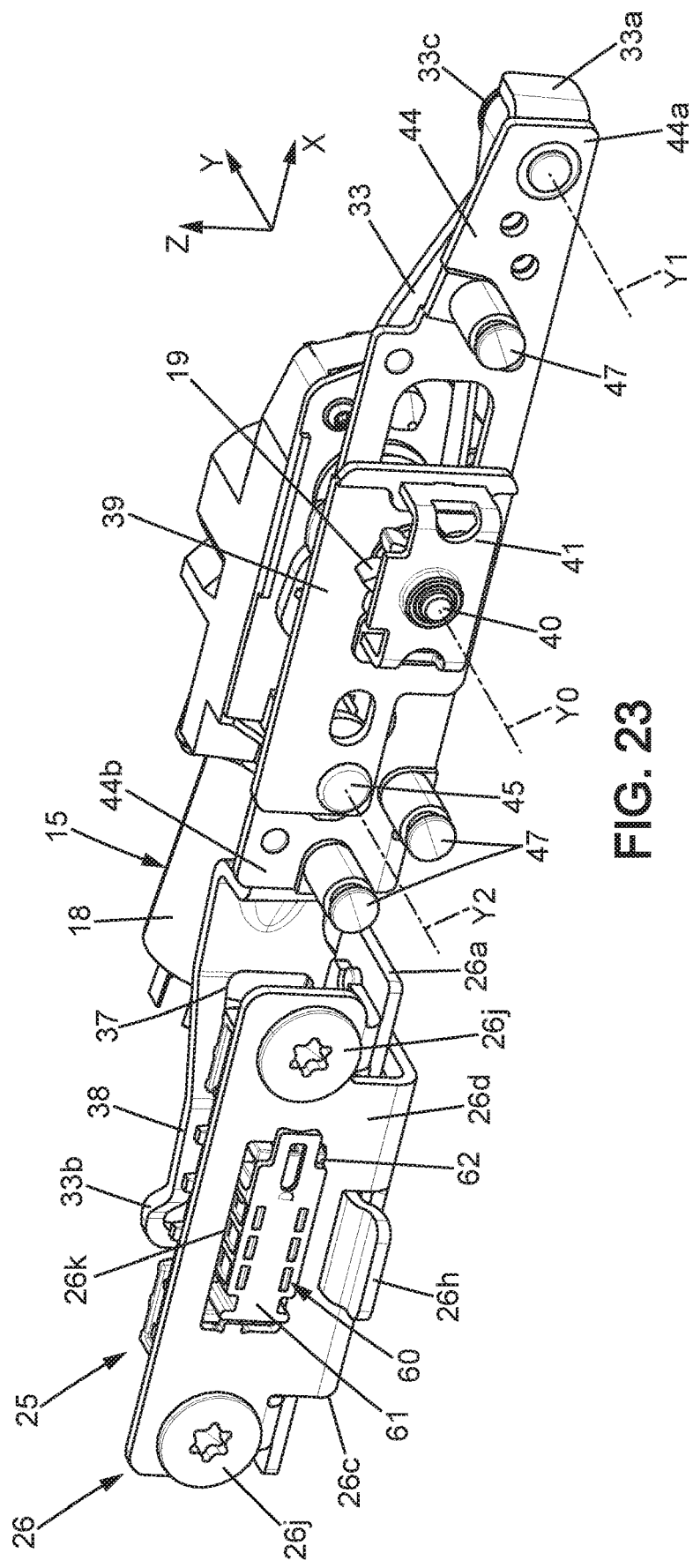
FIG. 23 is a view similar to FIG. 8, in the locking position.
Figure 24:
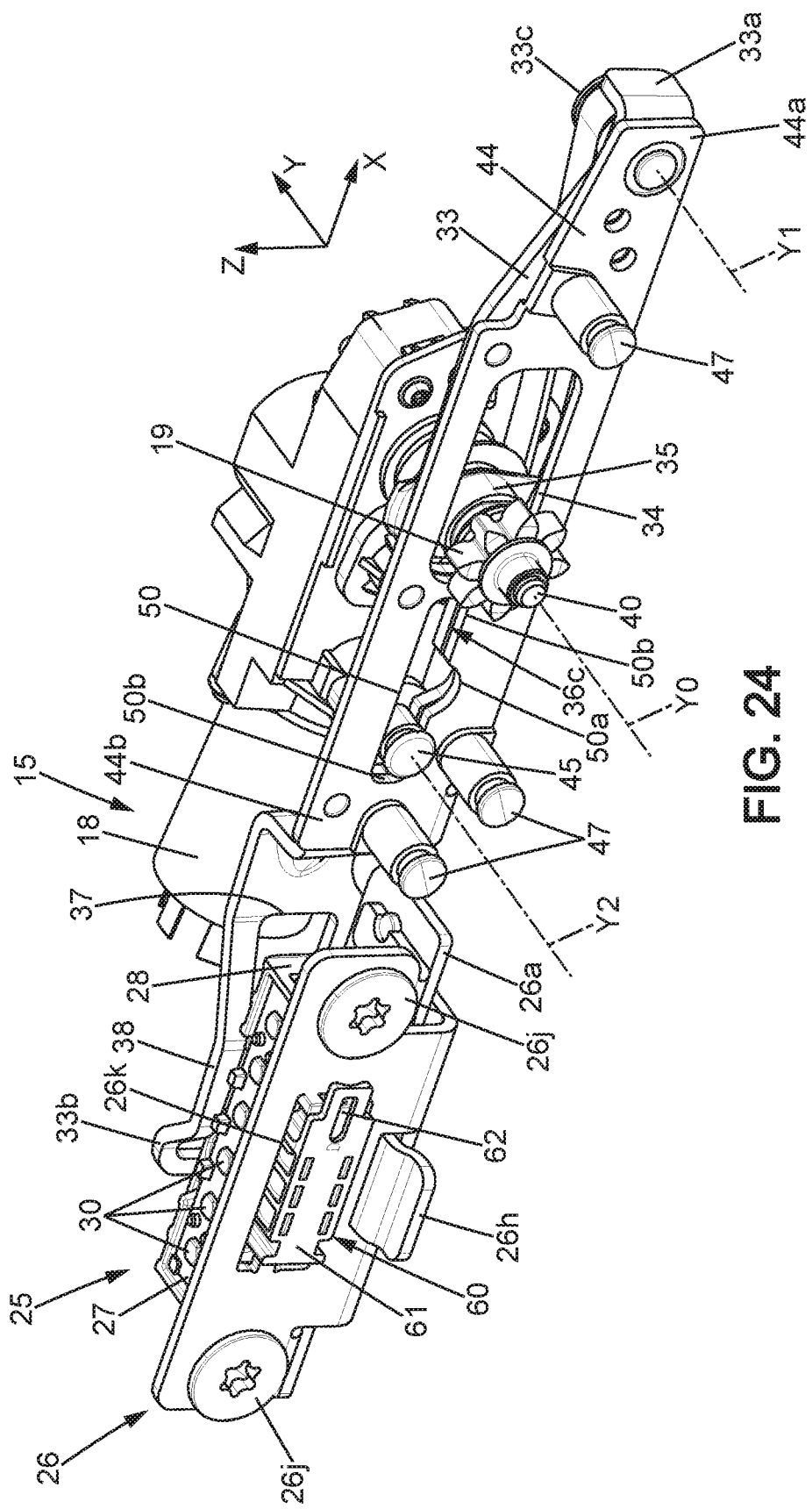
FIG. 24 is a view similar to FIG. 10, in the locking position.

When the vehicle in which the seat is installed is subjected to a front or rear impact, the seating portion 3 of the seat transmits to the movable section 16a a strong force parallel to the longitudinal direction X. When this force is greater than a certain threshold, for example between 0.7 kN and 5 kN, the force of the springs 29 is no longer sufficient to hold the pin 45 in the notch 36a. As shown in FIGS. 19 to 24, the movable section 16a then slides in the longitudinal direction X, with the lock control member 33, relative to the driving device 18 which remains secured to the first slide member 6 by the meshing of the pinion 19 with the rack 14. This movement causes a relative movement between the pin 45 and the slot 36, such that the pin 45 leaves the notch 36a and is in one of the rectilinear portions 36b of the slot 36 (FIG. 17). This movement causes the lock control member 33 to pivot downwards by camming between the pin and the cam edge formed by the lower edge of the slot 36. As a result, the lock control member 33 causes the lock body 27 to descend into the locking position, and at least one of the locking pistons 30 engages in one of the holes 12 of the first slide member 6, thus ensuring a mechanical locking which reinforces the meshing of the pinion 19 and rack 14.

As soon as one of the locking pistons 30 is engaged in one of the holes 12 of the first slide member 6, the lock 25 and the lock support 26 are immobilized, while the second slide member 16 can continue to travel the aforementioned distance j. While the second slide member 16 thus continues to travel distance j, the lock 25 is not load-bearing in the longitudinal direction, therefore the other locking pistons 30 can also descend into the locking position without being jammed by such applied stresses. As a result, all of the locking pistons 30, or at least most of the locking pistons 30, can descend to the locked position by entering the holes 12 of the first slide member and the receiving holes 26f of the flange 26e that is part of the lock support 26. Optimal mechanical strength allowing the slide rail 5 to withstand the impact is thus obtained.

Note that the cam edge 36c might not be formed in a slot. In addition, it would optionally be possible to ensure that the lock 25 is actuated only in the event of a front impact, in which case the cam edge 36c could comprise the notch 36a and a single rectilinear portion 36b towards the rear of the notch 36a. In this case, the clearance j could also be provided in only one direction, towards the rear of the screws 26i and tab 26h.

Furthermore, the portions 36b of the slot 36 could be non-rectilinear, without this changing the operation of the present disclosure.

After the impact, the slide rail can return to the normal position of use by actuation of the driving device to take up the relative movement between the movable section 16a and the driving device 18 which took place during the impact. This taking up movement may possibly be controlled automatically, in particular if the slide rail is equipped with a position sensor capable of measuring the position of the movable section 16a relative to the first slide member 6.

The invention claimed is:

1. A slide rail for a vehicle seat, comprising:
    a first slide member and a second slide member which are mounted so as to slide relative to one another along a longitudinal direction, the first slide member comprising holes aligned along the longitudinal direction,
    a mechanical lock mounted on the second slide member and comprising several locking members, each locking member being independently movable between an unlocked position where the locking member does not interfere with the holes of the first slide member, and a locked position where the locking member enters a hole of the first slide member to immobilize the first slide member and second slide member relative to one another, the locking members being resiliently biased towards the locking position and being either held in unlocked position when the lock is in an unlocking position, or freely movable to the locked position when the lock is in a locking position, the locking members and the holes of the first slide member being arranged so that several locking members can enter the holes of the first slide member when the lock is in the locking position,
    wherein the lock is mounted on the second slide member so as to provide translational clearance between the lock and the second slide member at least in one way along the longitudinal direction, said translational clearance allowing a limited travel of the second slide member in the longitudinal direction when at least one of the locking members is in the locking position.

2. The slide rail of claim 1, wherein the lock is mounted on the second slide member so as to provide the translational clearance between the lock and the second slide member in two opposite ways along the longitudinal direction.

3. The slide rail of claim 1, wherein the clearance is maintained resiliently.

4. The slide rail of claim 3, wherein the clearance is maintained by a resilient actuator comprising two actuator elements resiliently biased away from each other along the longitudinal direction, each actuator element bearing against an integral portion of the second slide member and against an integral portion of the lock in the longitudinal direction as long as the slide rail is in a normal situation of use.

5. The slide rail of claim 4, wherein the second slide member comprises a web and the lock is connected to the web of the second slide member by means of a lock support having a web parallel to the web of the second slide member, the resilient actuator being housed in a first opening formed in the web of the second slide member and in a second opening formed in the web of the lock support, each of the actuator elements bearing against an edge of the first opening and an edge of the second opening in the longitudinal direction as long as the slide rail is in a normal situation of use.

6. The slide rail of claim 4, wherein the two actuator elements together define a housing containing an actuator spring.

7. The slide rail of claim 1, further comprising:
    a motorized drive mechanism suitable for selectively either immobilizing or driving the second slide member relative to the first slide member, the second slide member being mounted to move relative to the motorized drive mechanism so as to be normally retained in a neutral position with respect to the motorized drive mechanism and the second slide member being movable from the neutral position when the second slide member is subjected to a force greater than a predetermined threshold in the longitudinal direction,
    and a lock control member mounted on the second slide member,
    the lock control member being connected to the motorized drive mechanism such that the lock control member is:
    in a rest position where the lock control member allows the lock to be in the unlocking position when the second slide member is in the neutral position with respect to the motorized drive mechanism,
    and in an actuating position where the lock control member controls the lock to move the lock to the locking position when the second slide member is moved from the neutral position with respect to the motorized drive mechanism.

8. The slide rail of claim 7, wherein the motorized drive mechanism comprises a driving device suitable for driving a pinion meshed with a rack that is part of the first slide member, the second slide member being mounted so as to slide in the longitudinal direction with respect to the driving device.

9. The slide rail of claim 8, wherein the driving device engages with the lock control member by cam action to move the lock control member into the actuating position when the second slide member is moved from the neutral position with respect to the motorized drive mechanism.

10. The slide rail of claim 1, wherein the clearance is a few millimeters, in particular between about 5 mm and about 10 mm.

11. A vehicle seat comprising a seating portion and two slide rails according to claim 1, the seating portion being carried by the second slide member of each slide rail.

* * * * *